(12) United States Patent
Takenaga

(10) Patent No.: US 6,600,990 B2
(45) Date of Patent: Jul. 29, 2003

(54) DEVICE FOR COPYING MAP-INFORMATION FROM CAR NAVIGATION SYSTEM

(75) Inventor: Takashi Takenaga, Tokyo (JP)

(73) Assignees: Pioneer Corporation, Tokyo (JP); Increment P Corporation, Tokyo (JP)

(*) Notice: Subject to any disclaimer, the term of this patent is extended or adjusted under 35 U.S.C. 154(b) by 0 days.

(21) Appl. No.: 09/775,573

(22) Filed: Feb. 5, 2001

(65) Prior Publication Data
US 2001/0012979 A1 Aug. 9, 2001

(30) Foreign Application Priority Data
Feb. 4, 2000 (JP) ........................................ 2000-028174

(51) Int. Cl.⁷ .............................................. G01C 21/26
(52) U.S. Cl. ...................... 701/200; 340/988; 73/178 R
(58) Field of Search ................................. 701/200, 208; 340/988, 989, 990, 991, 992, 993, 995; 73/178 R

(56) References Cited

U.S. PATENT DOCUMENTS

| | | | | |
|---|---|---|---|---|
| 3,589,327 A | * | 6/1971 | Harold | 116/29 |
| 4,827,420 A | * | 5/1989 | Musa | 701/208 |
| 5,177,685 A | * | 1/1993 | Davis et al. | 455/456 |
| 5,243,529 A | * | 9/1993 | Kashiwazaki | 340/990 |
| 5,517,419 A | * | 5/1996 | Lanckton et al. | 701/216 |
| 5,748,109 A | * | 5/1998 | Kosaka et al. | 340/995 |
| 5,902,349 A | * | 5/1999 | Endo et al. | 340/990 |
| 5,922,042 A | * | 7/1999 | Sekine et al. | 701/210 |
| 5,928,308 A | * | 7/1999 | Nanba et al. | 340/995 |
| 5,933,100 A | * | 8/1999 | Golding | |
| 5,941,932 A | * | 8/1999 | Aikawa et al. | 340/990 |
| 5,944,768 A | * | 8/1999 | Ito et al. | 701/200 |
| 5,945,927 A | * | 8/1999 | Nakayama et al. | |
| 5,987,381 A | * | 11/1999 | Oshizawa | 701/209 |
| 5,991,690 A | * | 11/1999 | Murphy | 701/211 |
| 6,012,013 A | * | 1/2000 | McBurney | |
| 6,035,253 A | * | 3/2000 | Hayashi et al. | 340/995 |
| 6,043,778 A | * | 3/2000 | Froeberg et al. | 342/357.14 |
| 6,058,350 A | * | 5/2000 | Ihara | 701/208 |
| 6,058,390 A | * | 5/2000 | Liaw et al. | 707/2 |
| 6,070,124 A | * | 5/2000 | Nimura et al. | 340/995 |
| 6,085,146 A | * | 7/2000 | Kuribayashi et al. | 701/200 |
| 6,098,015 A | * | 8/2000 | Nimura et al. | 701/201 |
| 6,147,626 A | * | 11/2000 | Sakakibara | |
| 6,169,516 B1 | * | 1/2001 | Watanabe et al. | 340/995 |
| 6,175,802 B1 | * | 1/2001 | Okude et al. | 348/118 |
| 6,199,012 B1 | * | 3/2001 | Hasegawa | 701/208 |
| 6,222,485 B1 | * | 4/2001 | Walters et al. | 340/995 |
| 6,226,591 B1 | * | 5/2001 | Okumura et al. | 701/207 |
| 6,256,578 B1 | * | 7/2001 | Ito | 340/990 |
| 6,268,825 B1 | * | 7/2001 | Okada | 342/357.13 |
| 6,278,928 B1 | * | 8/2001 | Aruga et al. | 477/97 |
| 6,282,490 B1 | * | 8/2001 | Nimura et al. | 340/990 |
| 6,295,503 B1 | * | 9/2001 | Inoue et al. | 340/905 |
| 6,324,467 B1 | * | 11/2001 | Machii et al. | 701/200 |
| 6,334,087 B1 | * | 12/2001 | Nakano et al. | 701/208 |
| 6,341,254 B1 | * | 1/2002 | Okude et al. | 701/208 |

FOREIGN PATENT DOCUMENTS

| | | | | |
|---|---|---|---|---|
| DE | 3115215 | * | 11/1982 | G01C/19/34 |
| DE | 3719702 | * | 12/1987 | G01C/21/04 |
| EP | 0357515 | * | 1/1989 | G01C/21/22 |
| JP | 10-13946 | * | 1/1989 | H04Q/7/38 |
| JP | 11-126019 | * | 5/1999 | G09B/29/10 |

* cited by examiner

Primary Examiner—William A. Cuchlinski, Jr.
Assistant Examiner—Olga Hernandez
(74) Attorney, Agent, or Firm—Arent Fox Kintner Plotkin & Kahn

(57) ABSTRACT

There are provided a CPU (11A) and an ignition key switch (17) detecting that a vehicle stops, and a transmission circuit (11C) and a transmitter (11D) for transmitting a map-image data for displaying a map image on a display (14) of a car navigation system, to a portable terminal (T) when the CPU (11A) and the ignition key switch (17) detects that the vehicle stops.

5 Claims, 1 Drawing Sheet

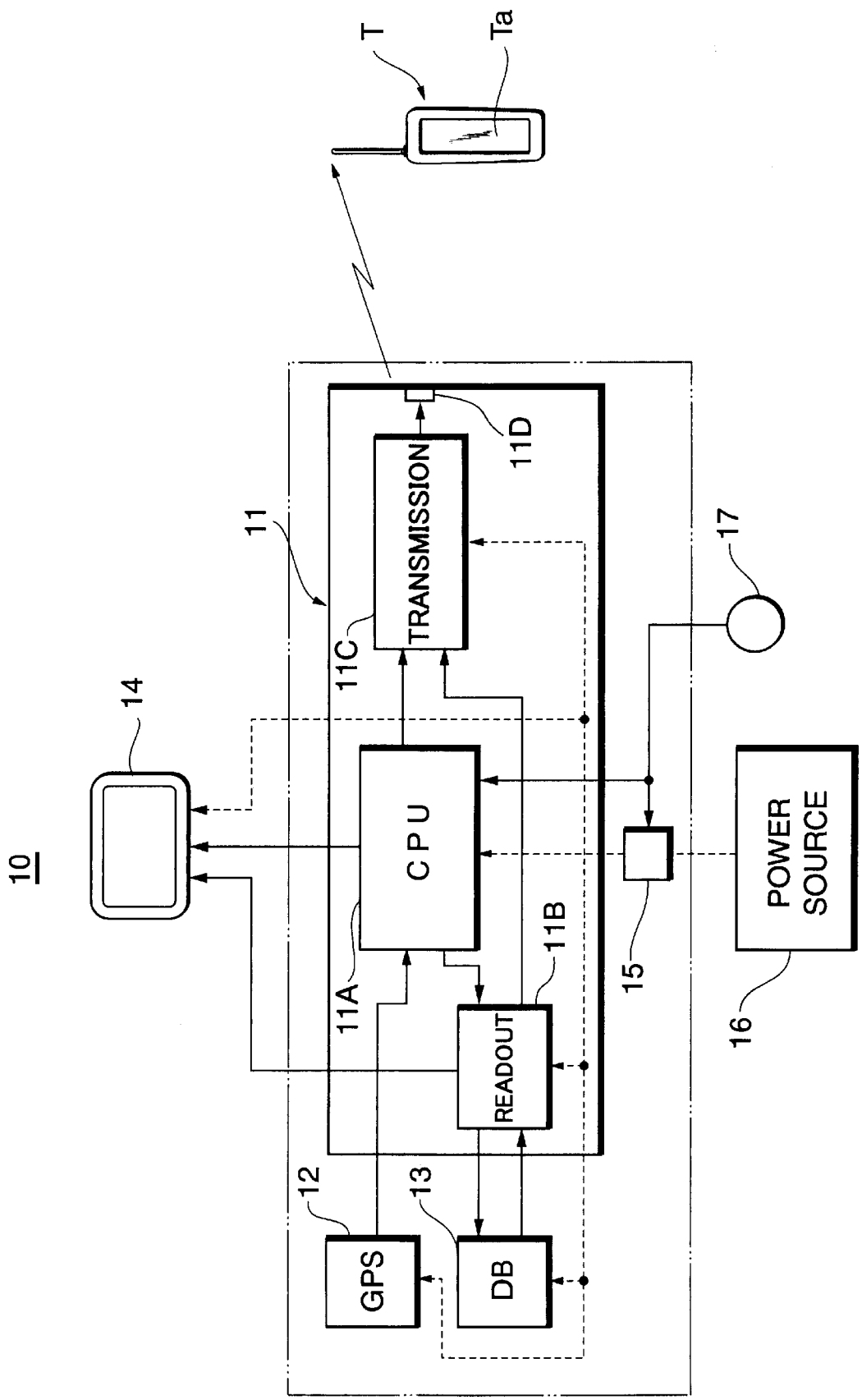

DEVICE FOR COPYING MAP-INFORMATION FROM CAR NAVIGATION SYSTEM

BACKGROUND OF THE INVENTION

1. Field of the Invention

The invention relates to a device for copy an area map information into a portable terminal for use.

2. Description of the Related Art

In recent years, portable terminals such as mobile telephones having a large display panel, PDAs (Personal Digital Assistants) have achieved widespread use.

A method of using a navigation system in which a communication function of the portable terminal and an image display function comprising a display panel are used to display a map image on the display panel of the portable terminal is suggested.

However, in order to display the map image on the display panel of the portable terminal, it is needed to copy the map information of an area to which a user will go from then from a database storing map information and store it in the portable terminal in advance. When the map information is copied, the user must designate an area to which the user goes from then, and perform operation for copy as occasion demands. This is considerably inconvenient if the user is in hurry to go there.

SUMMARY OF THE INVENTION

The present invention has been made for solving the problems arising when an area map information is stored in a portable terminal for use as described above.

It is therefore an object of the present invention to provide a device for copy map information which is capable of facilitating the storage of the map information of a required area in a portable terminal.

To attain the above object, a device for copy map-information from a car navigation system according to a first invention features in that vehicle stop detection means provided in the car navigation system for detecting that a vehicle stops, and transmission means provided in the car navigation system for reading out image data of a map including a stop position of the vehicle from a map-image database when the vehicle stop detection means detects that the vehicle stops to transmit it to a portable terminal.

In the device for copy map-information from a car navigation system according to the first invention, when the vehicle arrives at a destination and stops, the vehicle stop detection means detects the stopping of the vehicle.

The vehicle stop detection means detects that the vehicle stops, and hence, the transmission means transmits the image data of the map including the stop position of the vehicle read out from the database of the car navigation system to the portable terminal carried by a driver. The image data is then stored in memory mounted in the portable terminal.

Therefore, according to the first invention, when the driver dismounts the vehicle and moves to the final destination near the vehicle, since the data of the map image including the place where the vehicle is parked and the neighborhood is automatically stored in the portable terminal, the map image based on the map-image data is displayed on the display panel, thereby to allow the driver to easily check a way to the final destination.

To attain the aforementioned object, the device for copy map-information from a car navigation system according to a second invention features, in addition to the configuration of the first invention, in that the transmission means wirelessly transmits the map-image data to the portable terminal.

According to the device for copy map-information from a car navigation system of the second invention, if the driver simply carries the portable terminal, when the driver is dismounting the vehicle, the image data of the map of the neighborhood of the parked vehicle can be automatically stored in the portable terminal.

To attain the aforementioned object, the device for copy map-information from a car navigation system according to a third invention features, in addition to the configuration of the first invention, in that the vehicle stop detection means detects an OFF signal of an ignition key switch to detect the stopping of the vehicle.

According to the device for copy map-information from a car navigation system of the third invention, the detection of the stopping of the vehicle when the map-image data is transmitted to the portable terminal is performed based on the OFF signal outputted from the ignition key switch by handling when the driver turns off a vehicle engine off. When the OFF signal is outputted, the transmission of the map image data to the portable terminal is implemented.

To attain the aforementioned object, the device for copy map-information from a car navigation system according to a fourth invention features, in addition to the configuration of the first invention, in that the vehicle stop detection means detects a vehicle speed of the vehicle to detect the stopping of the vehicle.

According to the device for copy map-information from a car navigation system of the fourth invention, the detection of the stopping of the vehicle when the map-image data is transmitted to the portable terminal is performed based on the vehicle speed of the vehicle. When the vehicle speed becomes zero, the stop of the vehicle is detected. The transmission of the map-image data to the portable terminal is implemented.

To attain the aforementioned object, the device for copy map-information from a car navigation system according to a fifth invention features, in addition to the configuration of the first invention, in that set means for setting a range of the map-image data transmitted from the transmission means to the portable terminal is further provided.

According to the device for copy map-information from a car navigation system of the fifth invention, a range of the map image displayed by the map-image data transmitted from the car navigation system to the portable terminal, for example, a distance or a bearing from the parking position of the vehicle, may be set in advance by the set means.

To attain the aforementioned object, the device for copy map-information from a car navigation system according to a sixth invention features vehicle stop detection means provided in the car navigation system for detecting that a vehicle stops, and storage means provided in the car navigation system for reading out image data of a map including a stop position of the vehicle from a map-image database when the vehicle stop detection means detects that the vehicle stops to store it in a record medium connectable to a portable terminal.

In the device for copy map-information from a car navigation system according to the sixth invention, upon arriving at the destination and stopping, the vehicle stop detection means detects that the vehicle stops.

The vehicle stop detection means detects the stop of the vehicle, and hence the storage means temporally stores the image data of the map including the stop position of the vehicle from the database of the car navigation system into the record medium.

The driver removes the record medium storing the map-image data from the car navigation system and connects it to the portable terminal, thereby to display the map image based on the stored map-image data on the display of the portable terminal.

As described above, according to the sixth invention, when the driver dismounts the vehicle and moves to the final destination near the vehicle, since the data of the map image including the place where the vehicle is parked and the neighborhood is automatically stored in the record medium, by mounting the record medium in the portable terminal, the map image based on the map-image data is displayed on the display panel, thereby to allow the driver to easily check a way to the final destination.

These and other objects and advantages of the present invention will become obvious to those skilled in the art upon review of the following description, the accompanying drawings and appended claims.

BRIEF DESCRIPTION OF THE DRAWINGS

FIG. 1 is a circuit diagram showing an example of an embodiment according to the present invention.

DETAILED DESCRIPTION OF THE PREFERRED EMBODIMENT

Most preferred embodiment according to present invention would be described below in detail with reference to the accompanying drawings.

FIG. 1 is a circuit diagram illustrating an example of an embodiment of a map-information copy device from a car navigation system according to the present invention.

In FIG. 1, a car navigation system 10 includes a control unit 11, a GPS 12 detecting a position of a vehicle mounting the car navigation system 10 with radio waves from a satellite, a database (CD-ROM or DVD-ROM) 13 storing map-image data, and a display 14 displaying a map image for navigating.

The control unit 11 in turn includes a CPU 11A exercising control over the control for displaying the map images in the car navigation system 10, a readout circuit 11B reading required map-image data from the database 13 by control of the CPU 11A, and a transmission circuit 11C and a transmitter 11D for transmitting the map-image data read out by the readout circuit 11B to a portable terminal T as described later.

The control unit 11, GPS 12, database 13 and display 14 are connected via a delay circuit 15 to a power source (battery) 16.

The CPU 11A of the control unit 11 and the delay circuit 15 are connected to an ignition key switch 17 to receive an ON/OFF signal thereof.

Next, the following explanation is made for steps of copy the area of map information by the above map-information copy device.

When the ignition key switch 17 is turned on and the vehicle starts, the GPS 12 of the car navigation system 10 mounted in the vehicle detects a travel position of the vehicle, and outputs the detected position data to the CPU 11A of the control unit 11.

The CPU 11A outputs a readout signal to the readout circuit 11B in accordance with the received position data, to control it to read out map-image data including an area in which the vehicle is traveling at this point in time from the database 13.

The map-image data read out from the database 13 is output from the readout circuit 11B to the display 14, and also the position data detected by the aforementioned GPS 12 is applied to the display 14. In the display 14, a map image based on the map-image data is displayed, and also a mark representing a present position of the vehicle is displayed on the map image based on the position data.

The operation up to here is the same as that in a conventional car navigation system.

In this way, the vehicle arrives at a destination under navigation, and a driver turns the ignition key switch 17 off, whereupon the ignition key switch 17 applies the OFF signal to the CPU 11A and the delay circuit 15.

The delay circuit 15 receiving the OFF signal turns off power supply from the power source 16 to the control unit 11, GPS 12, database 13 and display 14 after the expiration of a predetermined time interval from that time.

The predetermined time interval until the delay circuit 15 turns power off is set at time of the completion of the transmission of the map-image data to the portable terminal T as described later.

Upon reception of the OFF signal from the ignition key switch 17, the CPU 11A outputs a command signal for controlling the transmission circuit 11C to transmit the map-image data, to the readout circuit 11B.

The readout circuit 11B receives the command signal from the CPU 11A, and outputs the map-image data, read out from the database 13 at that time, to the transmission circuit 11C. The transmission circuit 11C transmits the map-image data from the transmitter 11D to the portable terminal T.

In this way, the portable terminal T stores the map-image data transmitted from the car navigation system 10 in an internal memory, and displays a map image on a display panel Ta based on the map-image data.

After completing the transmission of the map-image data to the portable terminal T, the delay circuit 15 is actuated to turn off the power supply from the power source 16 to the car navigation system 10.

As described above, the vehicle travels during the operation of the car navigation system 10, and after it arrives at the destination, the ignition key switch 17 is turned off. From this time until the power supply to the car navigation system 10 is turned off, the image data of the map image displayed on the display 14 when the vehicle stops is automatically transmitted to the portable terminal T and stored therein.

For this reason, when the driver dismounts the vehicle and moves to the final destination near the vehicle, since the data of the map image including the place where the vehicle is parked and the neighborhood is stored in the portable terminal T, the map image based on the map-image data is displayed on the display panel Ta, thereby to allow the driver to easily check a way to the final destination.

It should be noted that the map-image data might be transmitted through a wire from the car navigation system 10 to the portable terminal T.

The above explanation is made for the case where the map image data is transmitted from the car navigation system to the portable terminal by means of the OFF signal from the ignition key switch. However, vehicle speeds of the vehicle may be detected and the map-image data may be transmitted when the vehicle stops.

Further, the map-image data may not be transmitted directly from the car navigation system to the portable terminal, and it maybe temporally stored in a record medium connected to the car navigation system, and the record medium may be mounted in the portable terminal. Alternatively, a range of the map image displayed by the map-image data transmitted from the car navigation system to the portable terminal, for example, a distance or a bearing from the parking position of the vehicle, may be set in advance.

The foregoing description is made for the case where the vehicle travels under the navigation and the map image is displayed on the display of the car navigation system until the vehicle stops. However, the map image may not be displayed on the display when the vehicle stops.

The terms and description used herein are set forth by way of illustration only and are not meant as limitations. Those skilled in the art will recognize that numerous variations are possible within the spirit and scope of the invention as defined in the following claims.

What is claimed is:

1. A device for copying map-information from a car navigation system, which has a current vehicle position detection means and a data base for accumulating map-image data, displays a current position of vehicle, and performs navigation, comprising:

vehicle stop detection means, other than the current vehicle position detection means, provided in the car navigation system for detecting a stopping of the vehicle, and transmission means provided in the car navigation system for reading out image data of a map including a stop position of the vehicle from a map-image database when said vehicle stop detection means detects a stopping of the vehicle to transmit the image data of the map to a portable terminal, which saves the map image data transmitted from said transmission means in an internal memory, and displays a map image on a display panel based on the saved map image data;

wherein said vehicle stop detection means detects an OFF signal of an ignition key switch to detect the stopping of the vehicle.

2. The device for copy map-information from a car navigation system according to claim 1, wherein said transmission means wirelessly transmits the map-image data to the portable terminal.

3. The device for copy map-information from a car navigation system according to claim 1, wherein said vehicle stop detection means detects a vehicle speed of the vehicle to detect the stopping of the vehicle.

4. The device for copy map-information from a car navigation system according to claim 1, further comprising set means for setting a range of the map-image data transmitted from said transmission means to the portable terminal.

5. A device for copying map-information from a car navigation system which has a current vehicle position detection means and a data base for accumulating map-image data, displays a current position of vehicle, and performs navigation, comprising:

vehicle stop detection means, other than the current vehicle position detection means, provided in the car navigation system for detecting a stopping of the vehicle, and storage means provided in the car navigation system for reading out image data of a map, including a stop position of the vehicle from the map-image database when said vehicle stop detection means detects a stopping of the vehicle, and for storing the stop position in a recording medium connectable to a portable terminal, which displays a map image on a display panel based on the stored map image data stored by said storage means in the recording medium;

wherein said vehicle stop detection means detects an OFF signal of an ignition key switch to detect the stopping of the vehicle.

* * * * *